Nov. 8, 1949 J. P. QUAM 2,487,371
JUICE EXTRACTOR FOR CITRUS FRUITS OR THE LIKE
Filed May 29, 1947
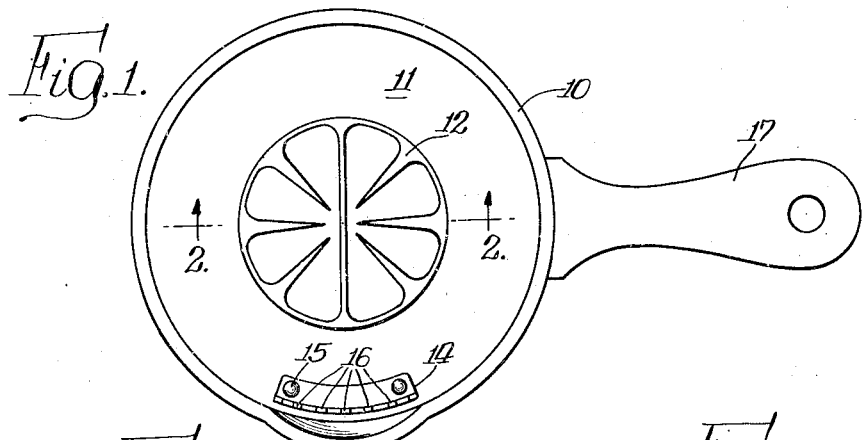
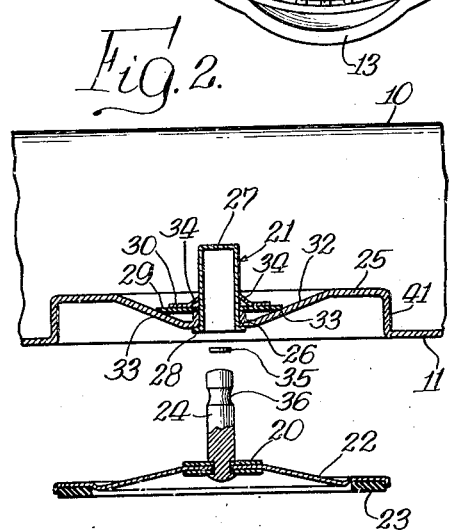
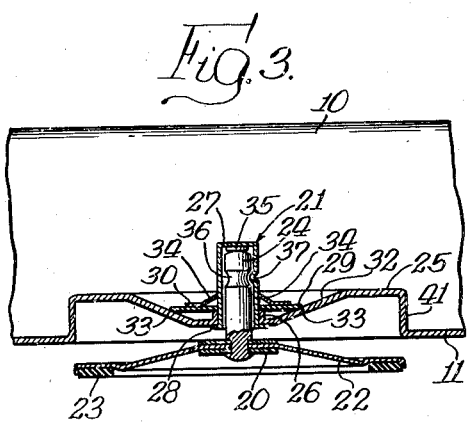
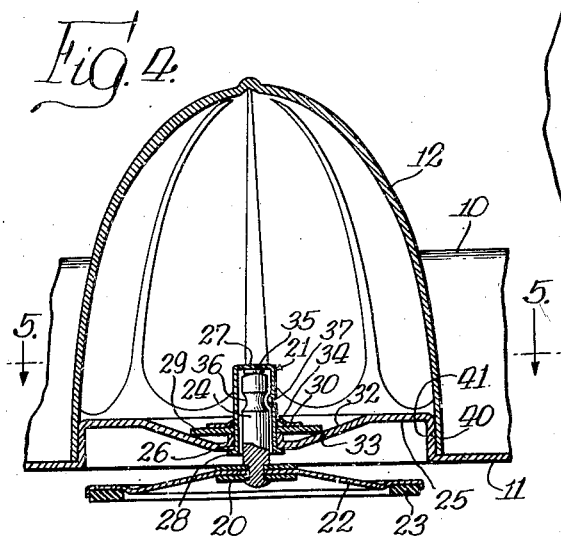
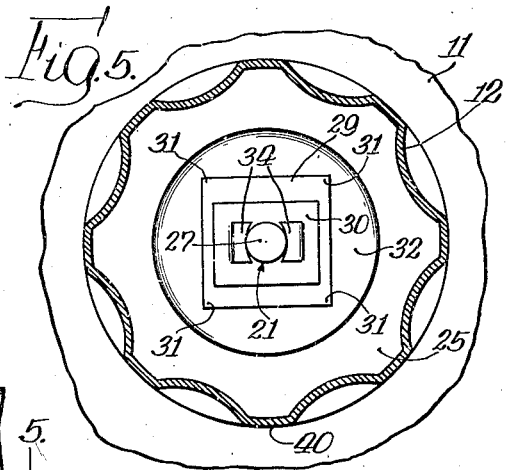
INVENTOR.
James P. Quam,
BY
Foorman L. Mueller
Atty.

Patented Nov. 8, 1949

2,487,371

UNITED STATES PATENT OFFICE 2,487,371

JUICE EXTRACTOR FOR CITRUS FRUITS OR THE LIKE

James P. Quam, Chicago, Ill., assignor to Quam-Nichols Company, Chicago, Ill., a corporation of Illinois Application May 29, 1947, Serial No. 751,436

2 Claims. (Cl. 146—3)

This invention relates generally to juice extracting devices and more particularly to a simple device for extracting juices from fruit such as oranges, lemons and the like.

In the prior art there are two general types of fruit juicers in general use. The first type includes relatively complicated machines having electrically driven reamers or having mechanically operated pressing members. The juicers of this type are relatively expensive and, being large, require a more or less permanent installation. Such devices are also complicated and require a certain amount of maintenance and are difficult to clean. The second and more common type of juicers includes the relatively simple glass juicers in which the orange or other fruit is turned relative to a reamer positioned thereon. Such juicers, which have long been used, are not subject to the above defects but are objectionable in that it is necessary to hold the juicer and simultaneously twist the fruit with respect thereto. This twisting movement is very tiresome and the general process is quite slow. Further, such juicers are effective to obtain only a certain part of the juice from the fruit and, therefore, are very inefficient.

It is, therefore, an object of the present invention to provide an improved device for extracting juice from citrus fruit and the like in which the juice can be extracted quickly and easily.

A further object of this invention is to provide an effective, simple fruit juicer which is small and can be inexpensively made and which is easy to clean.

A feature of this invention is the provision of a juicer having a mounting including a pedestal and a vertically extending pin and a shell secured to the container of the juicer and adapted to be positioned on the pin to provide a pivotal mounting for the container.

A further feature of this invention is the provision of a juicer having a pivotal mounting arranged to firmly grip a table or other supporting surface and allow the juicer to pivot freely thereon.

Further objects, features and advantages will be apparent from a consideration of the following description taken in connection with the accompanying drawings in which:

Fig. 1 is a top plan view of a fruit juicer in accordance with the invention;

Fig. 2 is an exploded cross-sectional view of the pivotal mounting along the lines 2—2 of Fig. 1;

Fig. 3 is an assembled view of the pivotal mounting;

Fig. 4 illustrates the mounting for the juicer and the manner in which the reamer is mounted; and Fig. 5 is a cross-sectional view along the lines 5—5 of Fig. 4 showing the washers for engaging the pivotal mounting.

In practicing my invention I provide a cup-shaped container or pan having a reamer for extracting juice from citrus fruit secured thereto. The container has an opening in the bottom thereof in which is secured a brass shell. A pivotal mounting is provided for the container including a pedestal having a base portion with a resilient gripping surface and a vertically extending pin of such size to be received in the shell secured to the container. The pin is also made of brass and a steel washer is positioned between the pin and the shell to eliminate the brass-to-brass contact. The shell is fastened to the container by a washer which fits tightly about the shell and has corners which dig into the bottom of the container. A handle is provided on the container which permits the container to be rotated so that when the juicer is used the fruit is held in position on the reamer and the reamer rotated by moving the handle back and forth. This eliminates the tiresome twisting movement normally required in using simple fruit juice extractors.

Referring now particularly to the drawings, in Fig. 1 there is illustrated a container 10 having a bottom wall 11 to which a reamer 12 is secured. The container includes a spout 13 adjacent which a strainer 14 is positioned. The strainer is secured to the bottom of the container, as by rivets 15 and includes a plurality of fingers 16 which extend substantially to the top edge of the container. A handle 17 is provided on the container and is secured thereto by rivets or other suitable means.

In Figs. 2 to 4 there is illustrated the detailed construction of a pivotal mounting for the container 10 in accordance with the invention. This mounting includes a pedestal 20 and a shell 21 which is secured to the bottom 11 of the container. The pedestal 20 includes a round base portion 22 having an annular insert 23 made of rubber or other resilient material which is effective to grip the surface of a table or other object on which the juicer is placed to provide a firm mounting without marring or scratching the surface. A pin 24 is secured to the base 22 and extends upward with respect to the base, The pin 24 may have a reduced portion which extends through an opening in the base with the end thereof peened over as is shown in the drawings, or may be secured to the base in any other suitable manner. As is apparent in Fig. 2 the bottom 11 of the container has an annular offset portion 25 which projects into the container. This offset portion has a central opening 26 in which the shell 21 is positioned. The shell 21 has a closed end 27 and an open end including an outwardly extending rim 28 which bears against the underneath side of the bottom 11 of the container about the opening 26. The shell is firmly held in the container by washers 29 and 30. These washers firmly grip the shell 21 and prevent its removal from the container.

In Fig. 5 the construction of the washers 29 and 30 and the manner in which they are used is clearly shown. Specifically, the washer 29 is square having an opening in the center. The opening is of the proper size to fit tightly about the shell 21. The washer 29 is pressed down against the shell in the bottom of the container until the corners 31 thereof dig into the slanting surface 32 of the bottom of the container as illustrated at 33 in Figs. 2 and 3. The sharp edges produced on the washer when it is punched out are not removed so that these edges penetrate the surface of the container. This prevents turning of the shell with respect to the container. The washer 30 is a lock washer which includes resilient gripping jaws 34 which bite into the sides of the brass shell to lock the shell 21 and container 10 into a tight assembly.

As previously stated, the pin 24 in the pedestal is of such size as to be received in the open end of the shell 21. The pin 24 and the shell 21 are made of brass or other suitable material. In order to prevent a direct brass-to-brass friction contact a small steel washer 35 is provided to rest between the top of pin 24 and the closed end 27 of the shell as shown in Fig. 3. To hold the shell and pin in position with respect to each other an annular groove 36 is provided in the pin in the top thereof and a detent 37 is punched in one side of the shell to engage the groove 36. This arrangement permits rotation of the shell with respect to the pin but prevents the shell from being removed from the pin.

In actually assembling the juicer as above described, the brass shell 21 is placed in a fixture and is placed into the opening 27 in the container which is preferably made of aluminum. While the shell is still in the fixture the square washer is placed down about the brass shell 21 until the corners 31 thereof engage the slanting surface 32 of the bottom 11 of the container. The corners dig sufficiently into the aluminum of the container to prevent rotation of the container with respect to the shell. While the shell is still in the fixture, the lock washer 30 is pressed on with the jaws 34 thereof biting into the shell to provide a preassembled unit. The shell is then removed from the fixture and can be mounted on the pedestal with the steel washer 35 being positioned between the pin and the shell to prevent the brass-to-brass contact which would provide substantial friction. The detent 37 is then punched in the shell to secure the pedestal thereto. Thereafter the reamer 12 is secured to the container, the reamer including an annular base portion 40 which engages the annular surface 41 of the offset portion 25 previously described. The assembled structure is shown in Fig. 4.

It is to be particularly noted that the reamer 12 is positioned about and covers the shell 21 and washers 29 and 30 which secure the shell in the container. Therefore, the shell and washers are not visible thus making an attractive appearance. As these components of the mounting are positioned in the space within the reamer 12, no additional space is required and a very compact assembly results. Also, as the moving parts are all inclosed, the juicer is very easy to clean.

Referring now to the operation of the juicer, the juicer can be positioned in any flat surface such as the top surface of a table or a cabinet. The annular resilient member 23 of the pedestal grips the surface on which it is positioned so that the juicer does not slip on this surface. The fruit from which juice is to be extracted is then cut in two and one-half thereof held firmly against the reamer 12. The reamer 12 is then rotated with respect to the fruit by back and forth movement of the handle 17. This movement is relatively easily accomplished due to the leverage obtained from the handle and also as the back and forth pushing movement is not as tiresome as the twisting movement normally required with a simple juice extractor. As the pedestal rests firmly on the support and does not slip, the operation is made very easy. The container can be made any size desired as, for example, it may be of a size to hold enough juice to fill a small fruit juice glass. To facilitate pouring the juice from the container the spout 13 is provided and the strainer 14 is positioned adjacent thereto with the fingers 16 being effective to retain pulp or seeds of the fruit so that only the juice is poured from the container.

It is apparent from the foregoing that the resulting juice extractor structure is relatively simple and can be inexpensively manufactured. The structure is sturdy and would require relatively little care to keep in good condition. As the parts of the juicer are all secured together as a unit, the juicer is very easy to clean and there is no danger of misplacing parts thereof. Although the container 10 and the reamer 12 of the juicer are preferably constructed of aluminum it is pointed out that any other suitable material can be used. Likewise other suitable material can be substituted for the brass shell 21 and pin 24 of the pivotal mounting.

Although I have described one embodiment of my invention which is believed to be representative thereof, it is obvious that various changes and modifications can be made therein without departing from the intended scope of the invention as defined in the appended claims.

I claim:

1. A juice extractor comprising a cup-shaped formed sheet metal container having a handle thereon, said container having a bottom with an annular offset portion extending into the container and an integral juice retaining portion extending radially from said offset portion, said offset portion having a hole in the center thereof, a pivot base for said container including a pedestal with a pin rigidly secured thereto and extending upwardly therefrom, a hollow shell open at one end and closed at the other end positioned in the offset portion hole and extending upwardly therefrom to receive said pedestal pin, means rigidly securing said shell in said container with said upwardly extending pin within said shell, and a formed sheet metal reamer hollow on the the inside thereof having an annular base portion frictionally retained on said container annular offset portion and enclosing within the hollow thereof the upstanding rigidly secured shell with the pedestal pin therein.

2. A juice extractor comprising a cup-shaped container made of relatively soft sheet metal, said container including a bottom having a central portion with a central opening and with an annular-surface slanted inwardly toward the opening, a pivot base for said container including a pedestal having a base portion and an upstanding pin secured thereto, an upstanding hollow shell open at the bottom positioned in said central portion opening and receiving said pin therein in a retained position but the shell being rotatable relative to the pin, means securing said shell to said container at said central portion including an apertured washer of such size as to fit snugly about said shell near the bottom thereof and having corners with sharp edges penetratingly engaging the metal of said slanted surface of said central portion and a lock washer positioned about said shell on top of said first mentioned washer having resilient jaws engaging said shell, a reamer secured to said container at said central portion and adjacent said slanted surface covering said shell and washer therewith, and a handle on said container to be grasped by an operator for rotating said container and said reamer thereon relative to said pin and pivot base.

JAMES P. QUAM.

REFERENCES CITED

The following references are of record in the file of this patent:

UNITED STATES PATENTS

| Number | Name | Date |
|---|---|---|
| 1,687,463 | Moscrip | Oct. 9, 1928 |
| 1,797,190 | Gilbert | Mar. 17, 1931 |
| 1,971,657 | Quam | Aug. 28, 1934 |
| 2,002,333 | Strauss | May 21, 1935 |
| 2,054,245 | Cummins | Sept. 15, 1936 |
| 2,130,755 | Gednetz | Sept. 20, 1938 |
| 2,315,018 | Lawrence | Mar. 30, 1943 |
| 2,348,145 | Perkins | May 2, 1944 |
| 2,404,382 | Klein | July 23, 1946 |
| 2,440,394 | Cockerill | Apr. 27, 1948 |